United States Patent
Chen et al.

(10) Patent No.: US 11,265,057 B2
(45) Date of Patent: Mar. 1, 2022

(54) METHOD, TERMINAL DEVICE AND NETWORK DEVICE FOR TRANSMITTING PHYSICAL UPLINK CONTROL CHANNEL (PUCCH)

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 68 days.

(21) Appl. No.: 16/756,101

(22) PCT Filed: Oct. 27, 2017

(86) PCT No.: PCT/CN2017/108069
§ 371 (c)(1),
(2) Date: Apr. 14, 2020

(87) PCT Pub. No.: WO2019/080107
PCT Pub. Date: May 2, 2019

(65) Prior Publication Data
US 2020/0336186 A1    Oct. 22, 2020

(51) Int. Cl.
*H04W 16/28* (2009.01)
*H04B 7/06* (2006.01)
(Continued)

(52) U.S. Cl.
CPC .......... *H04B 7/0626* (2013.01); *H04L 5/0051* (2013.01); *H04L 5/10* (2013.01);
(Continued)

(58) Field of Classification Search
CPC ... H04W 52/146; H04W 52/08; H04W 16/28; H04W 52/325; H04W 72/1284;
(Continued)

(56) References Cited

U.S. PATENT DOCUMENTS

2013/0153298 A1* 6/2013 Pietraski ............... H04L 5/0073
175/45
2013/0322376 A1* 12/2013 Marinier ............... H04L 5/0057
370/329
(Continued)

FOREIGN PATENT DOCUMENTS

CN    101917259    12/2010
CN    107113647    8/2017
(Continued)

OTHER PUBLICATIONS

Ericsson et al., "WF for remaining details on aperiodic CSI on PUCCH," 3GPP TSG-RAN WG1#90bis, R1-1718870, Oct. 2017, 3 pages.
(Continued)

*Primary Examiner* — Tu X Nguyen
(74) *Attorney, Agent, or Firm* — Hodgson Russ LLP

(57) ABSTRACT

A method for transmitting physical uplink control channel (PUCCH) includes: receiving, by a terminal device, downlink control information (DCI) sent by a network device, the DCI including trigger information of aperiodic channel state information (CSI) and configuration information of a PUCCH carrying the aperiodic CSI; and transmitting, by the terminal device, the aperiodic CSI on the PUCCH according to the configuration information of the PUCCH when the trigger information triggers the terminal device to report the aperiodic CSI.

18 Claims, 3 Drawing Sheets

(51) Int. Cl.
- *H04L 5/00* (2006.01)
- *H04L 5/10* (2006.01)
- *H04W 52/08* (2009.01)
- *H04W 52/14* (2009.01)
- *H04W 72/04* (2009.01)

(52) U.S. Cl.
CPC ......... *H04W 52/08* (2013.01); *H04W 52/146* (2013.01); *H04W 72/042* (2013.01)

(58) Field of Classification Search
CPC  H04W 48/12; H04W 72/1278; H04B 7/0626; H04B 7/0617; H04L 5/0023; H04L 1/0026; H04L 27/261
See application file for complete search history.

(56) References Cited

U.S. PATENT DOCUMENTS

| | | | |
|---|---|---|---|
| 2016/0262176 A1 | 9/2016 | Moulsley et al. | |
| 2018/0092156 A1* | 3/2018 | Kim | H04W 72/0406 |

FOREIGN PATENT DOCUMENTS

| | | |
|---|---|---|
| EP | 3253159 | 12/2017 |
| WO | 2013112024 | 8/2013 |
| WO | 2016077701 | 5/2016 |
| WO | 2016121433 | 8/2016 |

OTHER PUBLICATIONS

Ericsson, "On remaining details of CSI reporting," 3GPP TSG RAN WG1 Meeting 90bis, R1-1718432, Oct. 2017, 11 pages.
LG Electronics, "Discussion on NR-PUCCH allocation for CSI reporting," 3GPP TSG RAN WG1 Meeting #89, R1-1707646, May 2017, 3 pages.
EPO, Extended European Search Report for EP Application No. 17929820.3, dated Oct. 1, 2020.
WIPO, ISR for PCT/CN2017/108069, dated Jun. 1, 2018.
IPI, Office Action for IN Application No. 202017020409, dated Jun. 10, 2021.
EPO, Communication for EP Application No. 17929820.3, dated Oct. 14, 2021.

* cited by examiner

METHOD, TERMINAL DEVICE AND NETWORK DEVICE FOR TRANSMITTING PHYSICAL UPLINK CONTROL CHANNEL (PUCCH)

CROSS-REFERENCE TO RELATED APPLICATION

This application is a U.S. national phase application of International Application No. PCT/CN2017/108069, filed Oct. 27, 2017, the entire disclosure of which is incorporated herein by reference.

TECHNICAL FIELD

Embodiments of the present application relate to the field of communication, and more particularly, to a method for transmitting a physical uplink control channel (PUCCH), a terminal device, and a network device.

BACKGROUND

In a new radio (NR) system, aperiodic channel state information (CSI) may be carried over a physical uplink control channel (PUCCH). However, there is no specific scheme on how to transmit the aperiodic CSI on the PUCCH yet at present.

SUMMARY

In view of above, embodiments of the present application provide a method for transmitting a physical uplink control channel (PUCCH), a terminal device, and a network device, which are advantageous to improving a transmission performance of the PUCCH.

In a first aspect, there is provided a method for transmitting a physical uplink control channel (PUCCH). The method includes: receiving, by the terminal device, downlink control information (DCI) sent by the network device, the DCI including trigger information of channel state information (CSI) and configuration information of a PUCCH carrying the aperiodic CSI; and transmitting, by the terminal device, the aperiodic CSI on the PUCCH according to the configuration information of the PUCCH when the trigger information triggers the terminal device to report the aperiodic CSI.

By carrying in the DCI the configuration information of the PUCCH that carries the aperiodic CSI, transmission parameter of the PUCCH may be flexibly adjusted, which is advantageous to improving the transmission performance of the PUCCH.

The trigger information not only may indicate triggering the terminal device to report the aperiodic CSI, but also may indicate triggering report configuration of a corresponding CSI.

Optionally, the trigger information and the configuration information may also be an information field. For example, if the terminal device receives the configuration information of the PUCCH carried in the DCI, it is required by default to report the aperiodic CSI using the PUCCH.

In a possible implementation manner, the configuration information of the PUCCH includes at least one of: resource configuration information of the PUCCH, a transmitted power control (TPC) command of the PUCCH, reference signal resource configuration corresponding to the PUCCH, quasi-co-location (QCL) indication information of the PUCCH, and demodulation reference signal (DMRS) configuration of the PUCCH.

In a possible implementation manner, the configuration information of the PUCCH includes resource configuration information of the PUCCH, and the transmitting, by the terminal device, the aperiodic CSI on the PUCCH according to the configuration information of the PUCCH includes: determining, by the terminal device according to the resource configuration information of the PUCCH, time-frequency resource occupied by the PUCCH and/or PUCCH resource occupied by the PUCCH; and transmitting, by the terminal device, the aperiodic CSI on the time-frequency resource and/or the PUCCH resource.

In a possible implementation manner, the configuration information of the PUCCH includes a transmitted power control (TPC) command of the PUCCH, and the transmitting, by the terminal device, the aperiodic CSI on the PUCCH according to the configuration information of the PUCCH includes: determining, by the terminal device, a sending power of the PUCCH according to the TPC command; and transmitting, by the terminal device, the aperiodic CSI on the PUCCH by using the sending power.

In a possible implementation manner, the determining, by the terminal device, a sending power of the PUCCH according to the TPC command includes: determining, by the terminal device, a closed-loop power adjustment value of the PUCCH according to the TPC command; adjusting, by the terminal device according to the closed-loop power adjustment value, a calculated sending power; and determining, by the terminal device, a sending power after being adjusted as the sending power of the PUCCH.

In a possible implementation manner, the configuration information of the PUCCH includes reference signal resource configuration of the PUCCH, and the transmitting, by the terminal device, the aperiodic CSI on the PUCCH according to the configuration information of the PUCCH includes: determining, by the terminal device, a sending beam of the PUCCH according to the reference signal resource configuration; and transmitting, by the terminal device, the PUCCH by using the sending beam.

In a possible implementation manner, the determining, by the terminal device, a sending beam of the PUCCH according to the reference signal resource configuration includes: determining, by the terminal device, a sending beam or a receiving beam used for transmitting a reference signal on reference signal resource indicated by the reference signal resource configuration as the sending beam of the PUCCH.

In a possible implementation manner, the configuration information of the PUCCH includes demodulation reference signal (DMRS) configuration of the PUCCH, and the transmitting, by the terminal device, the aperiodic CSI on the PUCCH according to the configuration information of the PUCCH includes: determining, by the terminal device according to the DMRS configuration, a DMRS for demodulating the PUCCH; and transmitting, by the terminal device, the aperiodic CSI on the PUCCH according to the DMRS.

In a possible implementation manner, the configuration information of the PUCCH includes quasi-co-location (QCL) indication information of the PUCCH, and the transmitting, by the terminal device, the aperiodic CSI on the PUCCH according to the configuration information of the PUCCH includes: determining, by the terminal device, a sending beam of the PUCCH according to the QCL indication information; and transmitting, by the terminal device, the aperiodic CSI on the PUCCH by using the sending beam.

In a possible implementation manner, the determining, by the terminal device, a sending beam of the PUCCH according to the QCL indication information includes: determining, by the terminal device, an uplink signal quasi-co-located with the PUCCH according to the QCL indication information; and determining, by the terminal device, a sending beam of the uplink signal as the sending beam of the PUCCH.

In a possible implementation manner, the method further includes: determining, by the terminal device, an uplink channel carrying the aperiodic CSI as the PUCCH according to indication information sent by the network device.

In a possible implementation manner, the indication information is carried in the DCI.

In a possible implementation manner, the indication information is carried in a CSI report configuration corresponding to the aperiodic CSI.

In a possible implementation manner, the aperiodic CSI includes at least one of following information: a resource index of a channel state information reference signal (CSI-RS), a rank indication (RI), precoding information, and a channel quality indicator (CQI).

In a possible implementation manner, the DCI is DCI used for scheduling uplink transmission.

In a second aspect, there is provided a method for transmitting a physical uplink control channel (PUCCH). The method includes: sending, by a network device, downlink control information (DCI) to a terminal device, the DCI including trigger information of aperiodic channel state information (CSI) and configuration information of a PUCCH carrying the aperiodic CSI, causing the terminal device to transmit the aperiodic CSI on the PUCCH according to the configuration information of the PUCCH when the trigger information triggers the terminal device to report the aperiodic CSI.

In a possible implementation manner, the configuration information of the PUCCH includes at least one of following information: resource configuration information of the PUCCH, a transmitted power control (TPC) command of the PUCCH, reference signal resource configuration of the PUCCH, quasi-co-location (QCL) indication information of the PUCCH, and demodulation reference signal (DMRS) configuration of the PUCCH.

In a possible implementation manner, the method further includes: sending, by the network device, indication information to the terminal device, the indication information being used for indicating an uplink channel carrying the aperiodic CSI as the PUCCH.

In a possible implementation manner, the indication information is carried in the DCI.

In a possible implementation manner, the indication information is carried in a CSI report configuration corresponding to the aperiodic CSI.

In a possible implementation manner, the aperiodic CSI includes at least one of following information: a resource index of a channel state information reference signal (CSI-RS), a rank indication (RI), precoding information, and a channel quality indicator (CQI).

In a possible implementation manner, the DCI is DCI used for scheduling uplink transmission.

According to a third aspect, there is provided a terminal device, which is configured to perform the method in the first aspect or in any possible implementation manner of the first aspect. Specifically, the terminal device includes a unit configured to perform the method in the first aspect or in any possible implementation manner of the first aspect.

According to a fourth aspect, there is provided a network device, which is configured to perform the method in the second aspect or in any possible implementation manner of the first aspect. Specifically, the network device includes a unit configured to perform the method in the second aspect or in any possible implementation manner of the second aspect.

According to a fifth aspect, there is provided a terminal device, which includes: a memory, a processor, an input interface, and an output interface. The memory, the processor, the input interface, and the output interface are connected via a bus system. The memory is configured to store instructions, and the processor is configured to execute the instructions stored in the memory to perform the method in the first aspect or in any possible implementation manner of the first aspect.

According to a sixth aspect, there is provided a network device, which includes: a memory, a processor, an input interface, and an output interface. The memory, the processor, the input interface, and the output interface are connected via a bus system. The memory is configured to store instructions, and the processor is configured to execute the instructions stored in the memory to perform the method in the second aspect or in any possible implementation manner of the second aspect.

According to a seventh aspect, there is provided a computer storage medium, which is configured to store computer software instructions, including programs designed for executing the above aspects, to perform the method in the first aspect or in any possible implementation manner of the first aspect or the method in the second aspect or in any possible implementation manner of the second aspect.

According to an eighth aspect, there is provided a computer program product including instructions. When the computer program product runs on a computer, the computer is caused to perform the method in the first aspect or in any alternative implementation manner of the first aspect or the method in the second aspect or in any alternative implementation manner of the second aspect.

These and other aspects of the present application may become more readily apparent from the following description of the embodiments.

DETAILED DESCRIPTION

Figure 1:
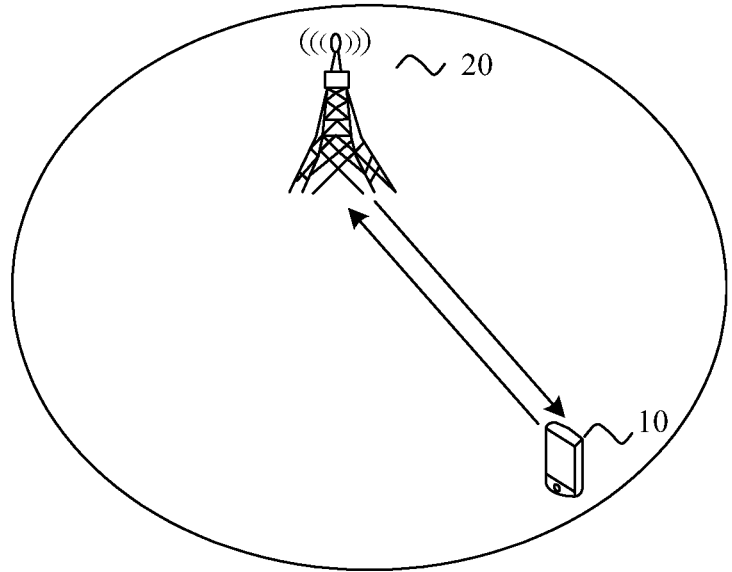
FIG. 1 illustrates a schematic diagram of an application scenario according to an embodiment of the present application.

Technical solutions in the embodiments of the present application will be described clearly and completely below with reference to the accompanying drawings in the embodiments of the present application.

It is to be understood that the technical solutions of the embodiments of the present application may be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, and New Radio (NR) or future 5G systems, etc.

Particularly, the technical solutions of the embodiments of the present application may be applied to a variety of communication systems based on non-orthogonal multiple access technologies, such as a sparse code multiple access (SCMA) system, and a low density signature (LDS) system, etc. Of course, the SCMA system and the LDS system may also be referred to as other names in the field of communication. Further, the technical solutions of the embodiments of the present application may also be applied to a multi-carrier transmission system using non-orthogonal multiple access technologies, for example, an orthogonal frequency division multiplexing (OFDM) system, a filter bank multi-carrier (FBMC) system, a generalized frequency division multiplexing (GFDM) system, and a filtered-OFDM (F-OFDM) system using non-orthogonal multiple access technologies, etc.

A terminal device in the embodiments of the present application may refer to user equipment (UE), an access terminal, a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, an SIP (Session Initiation Protocol) phone, a WLL (Wireless Local Loop) station, a PDA (Personal Digital Assistant), a handheld device having a wireless communication function, a computing device, or another processing device connected to a wireless modem, a vehicle-mounted device, a wearable device, a terminal device in a future 5G network, or a terminal device in a future evolutional PLMN (Public Land Mobile Network), etc. However, the embodiments of the present application are not limited thereto.

A network device in the embodiments of the present application may be a device for communicating with the terminal device. Specifically, the network device may be a Base Transceiver Station (BTS) in a GSM system or a CDMA system, a NodeB (NB) in a WCDMA system, an Evolutional NodeB (eNB or eNodeB) in an LTE system, a wireless controller in Cloud Radio Access Network (CRAN) scenario, or a relay station, an access point, a vehicle-mounted device, a wearable device, a network device in a future 5G network, or a network device in a future evolutional Public Land Mobile Network (PLMN), etc. However, the embodiments of the present application are not limited thereto.

FIG. 1 illustrates a schematic diagram of an application scenario according to an embodiment of the present application. The communication system in FIG. 1 may include a terminal device 10 and a network device 20. The network device 20 is configured to provide communication services to the terminal device 10 and access a core network. The terminal device 10 accesses the network by searching for a synchronization signal, a broadcast signal, and the like sent by the network device 20, thereby performing communication with the network. The arrows as shown in FIG. 1 may represent uplink/downlink transmission via a cellular link between the terminal device 10 and the network device 20.

Viewing from a network side, when a certain cell needs to send downlink data, a terminal may likely be required to send an aperiodic channel state information (CSI) report. In the LTE system, the aperiodic CSI is reported through a physical uplink shared channel (PUSCH). In the NR system, the aperiodic CSI may be reported through a PUSCH or a physical uplink control channel (PUCCH). When the aperiodic CSI is reported through the PUCCH, how to configure the PUCCH by the network side is a problem that needs to be solved.

It is to be understood that terms "system" and "network" herein are often used interchangeably herein. It is to be understood that the "and/or" used for describing an association relationship between association objects represents presence of three relationships. For example, A and/or B may represent presence of the A only, presence of both the A and the B, and presence of the B only. Moreover, Character "/" generally indicates that an "or" relationship is between the association objects.

Figure 2:
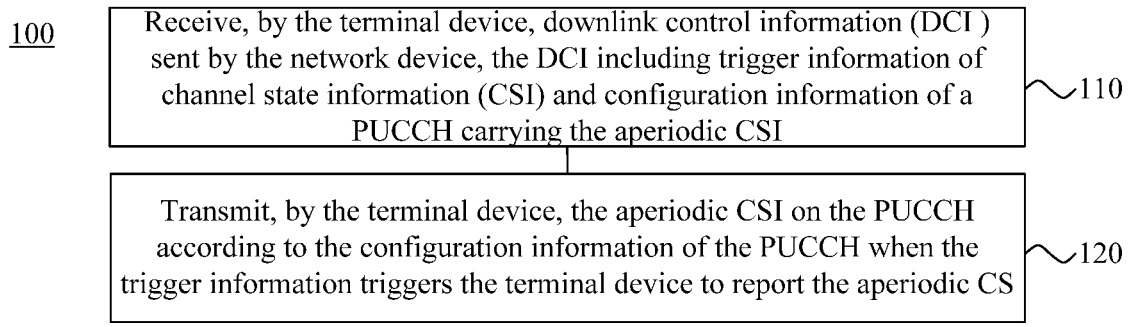
FIG. 2 illustrates a schematic block diagram of a method for transmitting a PUCCH according to an embodiment of the present application.

FIG. 2 illustrates a schematic block diagram of a method 100 for transmitting a PUCCH according to an embodiment of the present application. As shown in FIG. 2, this method 100 includes some or all contents as below.

In S110, a terminal device receives downlink control information (DCI) sent by a network device, wherein the DCI includes trigger information of channel state information (CSI) and configuration information of a PUCCH carrying the aperiodic CSI.

In S120, the terminal device transmits the aperiodic CSI on the PUCCH according to the configuration information of the PUCCH when the trigger information triggers the terminal device to report the aperiodic CSI.

It is to be noted that the trigger information in the embodiments of the present application not only may indicate triggering the terminal device to report the aperiodic CSI, but also may indicate triggering report configuration of a corresponding CSI. For instance, the network device may preconfigure a plurality of report configurations for the CSI, and the trigger information may indicate triggering one of the plurality of report configurations. The so-called report configuration may be various information of report configuration of the network device for the aperiodic CSI. That is, the trigger information may be used to notify the terminal device whether to report the aperiodic CSI and/or how to report the aperiodic CSI if it is needed to report the aperiodic CSI. For example, the trigger information may be some two bits in a certain downlink control information (DCI), wherein one bit may be used to indicate whether the terminal device needs to report the aperiodic CSI, and the other bit may be used to indicate how to report the CSI. In addition, the DCI may also carry configuration information about an uplink channel carrying the aperiodic CSI. For example, the DCI may carry time-frequency resources of the uplink channel, etc. If the DCI carries the configuration information of a PUCCH, this means that the network device may indicate the terminal device to transmit the aperiodic CSI using the PUCCH, and the terminal device may configure the PUCCH carrying the aperiodic CSI according to the configuration information. If the DCI carries the configuration information of a PUSCH, this means that the network device may indicate the terminal device to transmit the aperiodic CSI using the PUSCH, and the terminal device may configure the PUSCH carrying the aperiodic CSI according to the configuration information.

Therefore, using the method for transmitting a PUCCH in the embodiments of the present application, a network side can dynamically adjust configuration information of a PUCCH that carries an aperiodic CSI reported, which is beneficial to improving the transmission performance of the PUCCH.

It is to be understood that the trigger information and the configuration information either may be two independent information fields or may be one information field. For example, if the terminal device receives the configuration information of the PUCCH carried in the DCI, it is required by default to report the aperiodic CSI using the PUCCH. However, the embodiments of the present application are not limited thereto.

Optionally, the network device may also send to the terminal device indication information, indicating an uplink channel carrying the aperiodic CSI. For example, the indication information may be one bit, and the network device may agree with the terminal device that the indication information indicates a PUCCH if the bit is "0", and the indication information indicates a PUSCH if the bit is "1". If the indication information indicates that the aperiodic CSI is carried using a PUCCH, the configuration information carried in the DCI is used to configure the PUCCH. If the indication information indicates that the aperiodic CSI is carried using a PUSCH, the configuration information carried in the DCI is used to configure the PUSCH. The indication information may be carried in the same DCI signaling as the trigger information of the aperiodic CSI, or the indication information may occupy the same information domain as the trigger information. The indication information may also be carried in the report configuration of the aperiodic CSI. For example, the network device may correspond an uplink channel carrying the aperiodic CSI to the report configuration of the aperiodic CSI. That is, report configuration of each aperiodic CSI carries indication information corresponding to a certain uplink channel. The report configuration of the aperiodic CSI may be notified to the terminal device by the network device in advance. For example, the report configuration of the aperiodic CSI may be semi-statically configured through a radio resource control (RRC) signaling.

Optionally, the DCI may be scheduling information. For example, the DCI may be information for scheduling uplink transmission, but the embodiments of the present application are not limited thereto.

Optionally, in some embodiments of the present application, the configuration information of the PUCCH includes at least one of following information: resource configuration information of the PUCCH, a transmitted power control (TPC) command of the PUCCH, reference signal resource configuration corresponding to the PUCCH, quasi-co-location (QCL) indication information of the PUCCH, and demodulation reference signal (DMRS) configuration of the PUCCH.

It is to be understood that the configuration information carrying the aperiodic CSI includes, but is not limited to, the various information described above. Any information that can be used to configure the PUCCH shall be within the scope of protection of the technical solutions of the present application.

The technical solutions of the embodiments of the present application will be described in detail below in conjunction with the above instanced configuration information.

Optionally, in some embodiments of the present application, the configuration information of the PUCCH includes the resource configuration information of the PUCCH, and the transmitting, by the terminal device, the aperiodic CSI on the PUCCH according to the configuration information of the PUCCH includes: determining, by the terminal device according to the resource configuration information of the PUCCH, time-frequency resource occupied by the PUCCH and/or PUCCH resource occupied by the PUCCH; and transmitting, by the terminal device, the aperiodic CSI on the time-frequency resource and/or the PUCCH resource.

Following two terms are to be noted here. The time-frequency resource of the PUCCH belongs to a physical concept, whereas the PUCCH resource belongs to a logical concept, and there exists a mapping relationship between the time-frequency resource and the PUCCH resource. Generally, the so-called time-frequency resource may be any one of a bandwidth occupied by the PUCCH, the number of orthogonal frequency division multiplexing (OFDM) symbols occupied by the PUCCH, and an OFDM symbol occupied by the PUCCH. Furthermore, the time-frequency resource also may be the number of subcarriers occupied by the PUCCH, etc.

Optionally, in some embodiments of the present application, the configuration information of the PUCCH includes the transmitted power control (TPC) command of the PUCCH, and the transmitting, by the terminal device, the aperiodic CSI on the PUCCH according to the configuration information of the PUCCH includes: determining, by the terminal device, a sending power of the PUCCH according to the TPC command; and transmitting, by the terminal device, the aperiodic CSI on the PUCCH by using the sending power.

Power control is a common method used for improving communication quality. The basic principle of the transmitted power control may be as below. A receiver may compare a signal-to-interference ratio of a received signal with a signal-to-interference ratio target value, and then return a transmitted power control (TPC) command to a sender, to determine whether to increase the sending power or reduce the sending power based on a power control algorithm given by a high layer. Specifically, the terminal device may determine a closed-loop power adjustment value of the PUCCH according to the TPC command, then adjust a sending power according to the closed-loop power adjustment value, and transmit the aperiodic CSI on the PUCCH according to the adjusted sending power. Generally, the so-called closed-loop power adjustment value may be obtained by using a count-up mode (i.e., a mode where values indicated by the TPC command are counted based on an existing closed-loop power adjustment value), or may be obtained by using an absolute value mode (i.e., a mode where a value indicated by the TPC command is directly determined as the closed-loop power adjustment value).

Optionally, in some embodiments of the present application, the configuration information of the PUCCH includes the reference signal resource configuration of the PUCCH, and the transmitting, by the terminal device, the aperiodic CSI on the PUCCH according to the configuration information of the PUCCH includes: determining, by the terminal device, a sending beam of the PUCCH according to the reference signal resource configuration; and transmitting, by the terminal device, the PUCCH by using the sending beam.

Specifically, the terminal device may determine a sending beam or a receiving beam used for transmitting a reference signal on a reference signal resource indicated by the reference signal resource configuration as the sending beam of the PUCCH. The reference signal resource configuration may be indicative of resource for transmitting an uplink reference signal, such as resource of a sounding reference signal (SRS); or the reference signal resource configuration may be used for indicating downlink reference signal resource, for example, a channel state information-reference signal (CSI-RS) resource or a synchronization signal block (SSB). Further, whether the reference signal resource configuration indicates the uplink reference signal resource or the downlink reference signal resource may be determined according to a fact whether a beam correspondence of the terminal is available. If the beam correspondence of the terminal is available, the reference signal resource configuration may indicate the downlink reference signal resource. However, if the beam correspondence of the terminal is not available, the reference signal resource configuration may only indicate the uplink reference signal resource. The terminal device may report information about whether the beam correspondence is available to the network device in advance.

Optionally, in some embodiments of the present application, the configuration information of the PUCCH includes the demodulation reference signal (DMRS) configuration of the PUCCH, and the transmitting, by the terminal device, the aperiodic CSI on the PUCCH according to the configuration information of the PUCCH includes: determining, by the terminal device according to the DMRS configuration, a DMRS for demodulating the PUCCH; and transmitting, by the terminal device, the aperiodic CSI on the PUCCH according to the DMRS.

Specifically, the demodulation reference signal (DMRS) configuration may be indicative of a sequence of the DMRS and/or resource occupied by the DMRS.

Optionally, in some embodiments of the present application, the configuration information of the PUCCH includes the quasi-co-location (QCL) indication information of the PUCCH, and the transmitting, by the terminal device, the aperiodic CSI on the PUCCH according to the configuration information of the PUCCH includes: determining, by the terminal device, a sending beam of the PUCCH according to the QCL indication information; and transmitting, by the terminal device, the aperiodic CSI on the PUCCH by using the sending beam.

Specifically, the terminal device may determine an uplink signal quasi-co-located with the PUCCH according to the QCL indication information, and then further determine a sending beam of the PUCCH according to a beam used for transmitting the uplink signal. For example, the terminal device may directly determine the beam used for transmitting the uplink signal as the beam for transmitting the PUCCH. It is to be understood that this uplink signal and this PUCCH may receive parameter quasi-co-location only for space.

Optionally, in some embodiments of the present application, the aperiodic CSI includes at least one of following information: a resource index of a channel state information reference signal (CSI-RS), a rank indication (RI), precoding information, and a channel quality indicator (CQI).

Figure 3:
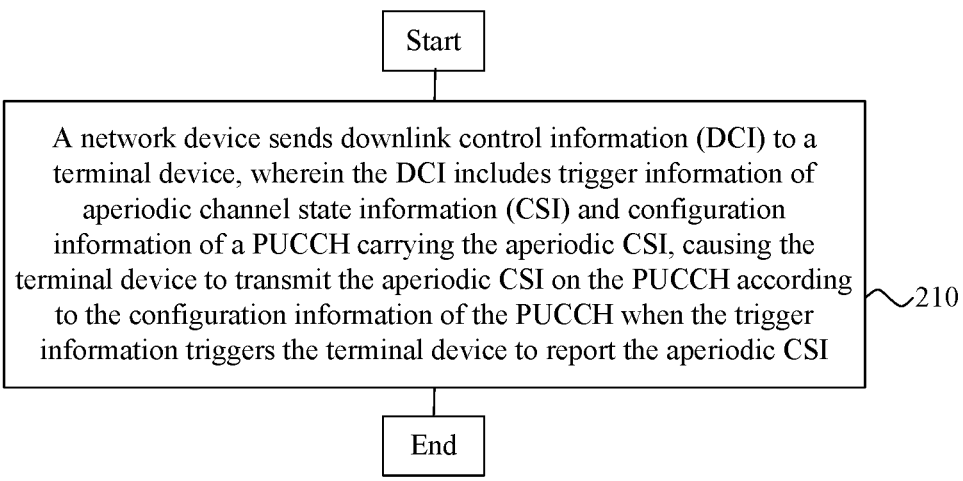
FIG. 3 illustrates another schematic block diagram of a method for transmitting a PUCCH according to an embodiment of the present application.

FIG. 3 illustrates a schematic block diagram of a method 200 for transmitting a PUCCH according to an embodiment of the present application. As shown in FIG. 3, this method 200 includes some or all contents as below.

In S210, a network device sends downlink control information (DCI) to a terminal device, wherein the DCI includes trigger information of aperiodic channel state information (CSI) and configuration information of a PUCCH carrying the aperiodic CSI, causing the terminal device to transmit the aperiodic CSI on the PUCCH according to the configuration information of the PUCCH when the trigger information triggers the terminal device to report the aperiodic CSI.

Therefore, using the method for transmitting a PUCCH in the embodiments of the present application, a network side can dynamically adjust configuration information of a PUCCH that carries an aperiodic CSI reported, which is beneficial to improving the transmission performance of the PUCCH.

Optionally, in some embodiments of the present application, the configuration information of the PUCCH includes at least one of following information: resource configuration information of the PUCCH, a transmitted power control (TPC) command of the PUCCH, reference signal resource configuration of the PUCCH, quasi-co-location (QCL) indication information of the PUCCH, and demodulation reference signal (DMRS) configuration of the PUCCH.

Optionally, in some embodiments of the present application, the method further includes: sending, by the network device, indication information to the terminal device, the indication information being used for indicating an uplink channel carrying the aperiodic CSI as the PUCCH.

Optionally, in some embodiments of the present application, the indication information is carried in the DCI.

Optionally, in some embodiments of the present application, the indication information is carried in a CSI report configuration corresponding to the aperiodic CSI.

Optionally, in some embodiments of the present application, the aperiodic CSI includes at least one of following information: a resource index of a channel state information reference signal (CSI-RS), a rank indication (RI), precoding information, and a channel quality indicator (CQI).

Optionally, in some embodiments of the present application, the DCI is DCI used for scheduling uplink transmission.

It is to be understood that the interaction between the network device and the terminal device as well as related characteristics, functions, and the like described for the network device correspond to related characteristics and functions of the terminal device. Furthermore, related contents have been described in detail in the above method 100, and thus, no further details are provided herein for brevity.

It is also to be understood that in the embodiments of the present application, a sequence number of each procedure above does not mean an execution sequence, and the execution sequence of each procedure shall be determined by its function and an internal logic, and shall not impose a limit on the implementation process of the embodiments of the present application.

The method for transmitting a PUCCH according to the embodiments of the present application have been described in detail above. An apparatus for transmitting a PUCCH according to embodiments of the present application will be described below with reference to FIG. 4 to FIG. 7. It is to be understood that technical features set forth in the method embodiments are also applicable to the following apparatus embodiments.

Figure 4:
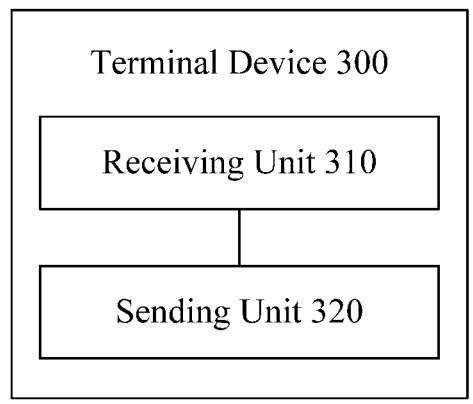
FIG. 4 illustrates a schematic block diagram of a terminal device according to an embodiment of the present application.

FIG. 4 illustrates a schematic block diagram of a terminal device 300 according to an embodiment of the present application. As shown in FIG. 4, the terminal device 300 includes:

a receiving unit 310, configured to receive downlink control information (DCI) sent by a network device, the DCI including trigger information of channel state information (CSI) and configuration information of a PUCCH carrying the aperiodic CSI; and a sending unit 320, configured to transmit the aperiodic CSI on the PUCCH according to the configuration information of the PUCCH when the trigger information triggers the terminal device to report the aperiodic CSI.

Therefore, using the terminal device in the embodiments of the present application, a network side can dynamically adjust configuration information of a PUCCH that carries an aperiodic CSI reported, which is beneficial to improving the transmission performance of the PUCCH.

Optionally, in some embodiments of the present application, the configuration information of the PUCCH includes at least one of following information: resource configuration information of the PUCCH, a transmitted power control (TPC) command of the PUCCH, reference signal resource configuration corresponding to the PUCCH, quasi-co-location (QCL) indication information of the PUCCH, and demodulation reference signal (DMRS) configuration of the PUCCH.

Optionally, in some embodiments of the present application, the configuration information of the PUCCH includes the resource configuration information of the PUCCH. The terminal device further includes a determining unit, which is configured to determine, according to the resource configuration information of the PUCCH, time-frequency resource occupied by the PUCCH and/or PUCCH resource occupied by the PUCCH. The sending unit is specifically configured to transmit the aperiodic CSI on the time-frequency resource and/or the PUCCH resource.

Optionally, in some embodiments of the present application, the configuration information of the PUCCH includes the transmitted power control (TPC) command of the PUCCH. The terminal device further includes a determining unit, which is configured to determine a sending power of the PUCCH according to the TPC command. The sending unit is specifically configured to transmit the aperiodic CSI on the PUCCH by using the sending power.

Optionally, in some embodiments of the present application, the determining unit is specifically configured to: determine a closed-loop power adjustment value of the PUCCH according to the TPC command; adjust, according to the closed-loop power adjustment value, a sending power obtained by calculation; and determine the adjusted sending power as the sending power of the PUCCH.

Optionally, in some embodiments of the present application, the configuration information of the PUCCH includes the reference signal resource configuration of the PUCCH. The terminal device further includes a determining unit, which is configured to determine a sending beam of the PUCCH according to the reference signal resource configuration. The sending unit is specifically configured to transmit the PUCCH by using the sending beam.

Optionally, in some embodiments of the present application, the determining unit is specifically configured to determine a sending beam or a receiving beam used for transmitting a reference signal on a reference signal resource indicated by the reference signal resource configuration as the sending beam of the PUCCH.

Optionally, in some embodiments of the present application, the configuration information of the PUCCH includes the demodulation reference signal (DMRS) configuration of the PUCCH. The terminal device further includes a determining unit, which is configured to determine, according to the DMRS configuration, a DMRS for demodulating the PUCCH. The sending unit is specifically configured to transmit the aperiodic CSI on the PUCCH according to the DMRS.

Optionally, in some embodiments of the present application, the configuration information of the PUCCH includes the quasi-co-location (QCL) indication information of the PUCCH. The terminal device further includes a determining unit, which is configured to determine a sending beam of the PUCCH according to the QCL indication information. The sending unit is specifically configured to transmit the aperiodic CSI on the PUCCH by using the sending beam.

Optionally, in some embodiments of the present application, the determining unit is specifically configured to determine an uplink signal quasi-co-located with the PUCCH according to the QCL indication information, and determine a sending beam of the uplink signal as the sending beam of the PUCCH.

Optionally, in some embodiments of the present application, the terminal device further includes a determining unit, which is configured to determine an uplink channel carrying the aperiodic CSI as the PUCCH according to indication information sent by the network device.

Optionally, in some embodiments of the present application, the indication information is carried in the DCI.

Optionally, in some embodiments of the present application, the indication information is carried in a CSI report configuration corresponding to the aperiodic CSI.

Optionally, in some embodiments of the present application, the aperiodic CSI includes at least one of following information: a resource index of a channel state information reference signal (CSI-RS), a rank indication (RI), precoding information, and a channel quality indicator (CQI).

Optionally, in some embodiments of the present application, the DCI is DCI used for scheduling uplink transmission.

It is to be understood that the terminal device 300 according to the embodiments of the present application may correspond to the terminal device in the embodiments of the present application, and the above and other operations and/or functions of each unit in the terminal device 300 are provided respectively to implement corresponding procedure of the method as shown in FIG. 2, and their detailed descriptions are omitted here for brevity.

Figure 5:
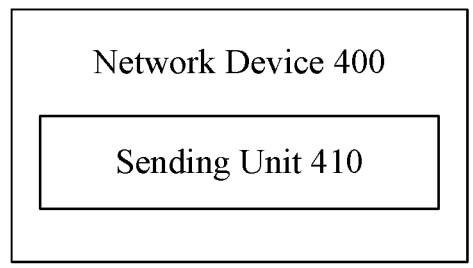
FIG. 5 illustrates a schematic block diagram of a network device according to an embodiment of the present application.

FIG. 5 illustrates a schematic block diagram of a network device 400 according to an embodiment of the present application. As shown in FIG. 5, the network device 400 includes:

a sending unit 410, configured to send downlink control information (DCI) to a terminal device. The DCI includes trigger information of the aperiodic channel state information (CSI) and configuration information of a PUCCH carrying the aperiodic CSI, causing the terminal device to transmit the aperiodic CSI on the PUCCH according to the configuration information of the PUCCH when the trigger information triggers the terminal device to report the aperiodic CSI.

Therefore, using the network device in the embodiments of the present application, a network side can dynamically adjust configuration information of a PUCCH that carries an aperiodic CSI reported, which is beneficial to improving the transmission performance of the PUCCH.

Optionally, in some embodiments of the present application, the configuration information of the PUCCH includes at least one of following information: resource configuration information of the PUCCH, a transmitted power control (TPC) command of the PUCCH, reference signal resource configuration of the PUCCH, quasi-co-location (QCL) indication information of the PUCCH, and demodulation reference signal (DMRS) configuration of the PUCCH.

Optionally, in some embodiments of the present application, the sending unit is further configured to:

send indication information to the terminal device, the indication information being used for indicating that an uplink channel carrying the aperiodic CSI is the PUCCH.

Optionally, in some embodiments of the present application, the indication information is carried in the DCI.

Optionally, in some embodiments of the present application, the indication information is carried in a CSI report configuration corresponding to the aperiodic CSI.

Optionally, in some embodiments of the present application, the aperiodic CSI includes at least one of following information: a resource index of a channel state information reference signal (CSI-RS), a rank indication (RI), precoding information, and a channel quality indicator (CQI).

Optionally, in some embodiments of the present application, the DCI is DCI used for scheduling uplink transmission.

It is to be understood that the network device 400 according to the embodiments of the present application may correspond to the network device in the embodiments of the present application, and the above and other operations and/or functions of each unit in the network device 400 are provided respectively to implement corresponding procedure of the network device as shown in FIG. 3, and their detailed descriptions are omitted here for brevity.

Figure 6:
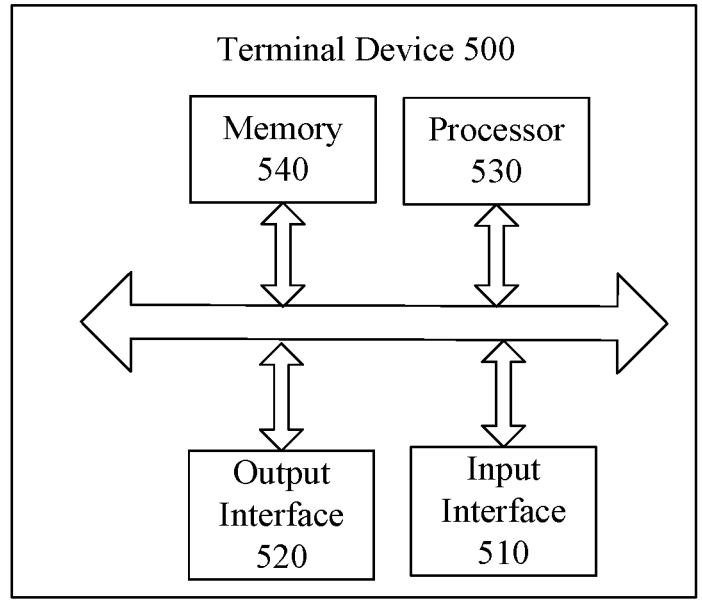
FIG. 6 illustrates another schematic block diagram of a terminal device according to an embodiment of the present application.

As shown in FIG. 6, the embodiments of the present application further provide a terminal device 500, wherein the terminal device 500 may be the terminal device 300 in FIG. 4, and the terminal device 500 can be configured to execute contents of the terminal device corresponding to the method 100 in FIG. 2. The terminal device 500 includes an input interface 510, an output interface 520, a processor 530, and a memory 540. The input interface 510, the output interface 520, the processor 530, and the memory 540 may be connected via a bus system. The memory 540 is configured to store programs, instructions or codes. The processor 530 is configured to execute the programs, the instructions or the codes in the memory 540 to control the input interface 510 to receive a signal, and control the output interface 520 to send a signal and complete the operations in the foregoing method embodiments.

Therefore, using the terminal device in the embodiments of the present application, a network side can dynamically adjust configuration information of a PUCCH that carries an aperiodic CSI reported, which is beneficial to improving the transmission performance of the PUCCH.

It is to be understood that in the embodiments of the present application, the processor 530 may be a central processing unit (CPU), or may be other general-purpose processor, digital signal processor (DSP), application-specific integrated circuit (ASIC), field programmable gate array (FPGA) or other programmable logic device, discrete gate or transistor logic device, or discrete hardware component, etc. The general-purpose processor may be a microprocessor, or the processor may be any conventional processor or the like.

The memory 540 may include a read-only memory (ROM) and a random access memory (RAM), and provide instructions and data to the processor 530. The memory 540 also may partly include a non-volatile random access memory. For example, the memory 540 also may store information of device type.

In an implementation process, steps of the foregoing methods may be implemented by using an integrated logic circuit of hardware in the processor 530 or an instruction in a software form. The steps of the methods disclosed in the embodiments of the present application may be directly executed by a hardware processor, or may be executed by a combination of hardware and software modules in a processor. The software module may be located in a mature storage medium in the field, such as a random access memory, a flash memory, a read-only memory, a programmable read-only memory, an electrically-erasable programmable memory, or a register. The storage medium is located in the memory 540, and the processor 530 reads information in the memory 540 and implements the steps of the foregoing methods in combination with the hardware of the processor 430. To avoid repetitions, detailed description is omitted herein.

In a specific implementation manner, the sending unit in the terminal device 300 can be implemented by using the output interface 520 in FIG. 6, the receiving unit in the terminal device 300 can be implemented by using the input interface 510 in FIG. 6, and the determining unit in the terminal device 300 can be implemented by using the processor 530 in FIG. 6.

Figure 7:
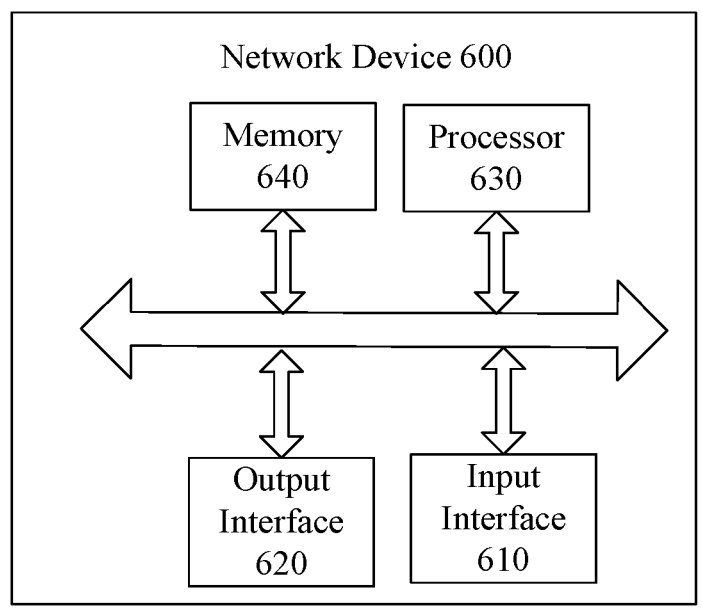
FIG. 7 illustrates another schematic block diagram of a network device according to an embodiment of the present application.

As shown in FIG. 7, the embodiments of the present application further provide a network device 600, wherein the network device 600 may be the network device 400 in FIG. 5, and the network device 600 can be configured to execute contents of the network device corresponding to the method 200 in FIG. 3. The network device 600 includes an input interface 610, an output interface 620, a processor 630, and a memory 640. The input interface 610, the output interface 620, the processor 630, and the memory 640 may be connected via a bus system. The memory 640 is configured to store programs, instructions or codes. The processor 630 is configured to execute the programs, the instructions or the codes in the memory 640 to control the input interface 610 to receive a signal, and control the output interface 620 to send a signal and complete the operations in the foregoing method embodiments.

Therefore, using the network device in the embodiments of the present application, a network side can dynamically adjust configuration information of a PUCCH that carries an aperiodic CSI reported, which is beneficial to improving the transmission performance of the PUCCH.

It is to be understood that in the embodiments of the present application, the processor 630 may be a central processing unit (CPU), or may be other general-purpose processor, digital signal processor (DSP), application-specific integrated circuit (ASIC), field programmable gate array (FPGA) or other programmable logic device, discrete gate or transistor logic device, or discrete hardware component, etc. The general-purpose processor may be a microprocessor, or the processor may be any conventional processor or the like.

The memory 640 may include a read-only memory (ROM) and a random access memory (RAM), and provide instructions and data to the processor 630. The memory 640 also may partly include a non-volatile random access memory. For example, the memory 640 also may store information of device type.

In an implementation process, steps of the foregoing methods may be implemented by using an integrated logic circuit of hardware in the processor 630 or an instruction in a software form. The steps of the methods disclosed in the embodiments of the present application may be directly executed by a hardware processor, or may be executed by a combination of hardware and software modules in a processor. The software module may be located in a mature storage medium in the field, such as a random access memory, a flash memory, a read-only memory, a programmable read-only memory, an electrically-erasable programmable memory, or a register. The storage medium is located in the memory 640, and the processor 630 reads information in the memory 640 and implements the steps of the foregoing methods in combination with the hardware of the processor 430. To avoid repetitions, detailed description is omitted herein.

In a specific implementation manner, the sending unit in the network device 400 can be implemented by using the output interface 620 in FIG. 7.

Persons of ordinary skill in the art may realize that it is possible to implement, by electronic hardware or a combination of computer software and electronic hardware, steps of units and methods in various examples as described in the embodiments disclosed herein. Whether these functions are executed in a hardware mode or a software mode depends on specific applications and design constraints on the technical solutions. Technical professionals may use different methods to implement functions as described in each of the specific applications. However, the implementation shall be not believed beyond the scope of the present application.

Persons skilled in the art may clearly understand that for a convenient and concise description, a concrete work process of systems, apparatuses and units described above may refer to a corresponding process of the foregoing method embodiments, which is not repeated anymore herein.

From several embodiments provided in the present application, it should be understood that the disclosed systems, apparatuses and methods may be implemented in other ways. For example, the apparatus embodiments described above are merely exemplary. For example, a unit partition is merely a logic functional partition. In actual implementation, additional manners of partitioning may be available. For another example, a plurality of units or components may be combined or integrated into another system, or some features may be ignored or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, i.e., either located at one place or distributed on a plurality of network units. Units may be selected in part or in whole according to actual needs for achieving objectives of the solution of this embodiment.

In addition, various functional units in various embodiments of the present application may be integrated into one processing unit, or various units may be separately or physically existent, or two or more units may be integrated into one unit.

When the functions are implemented in the form of a software functional unit and sold or used as an independent product, the functions may be stored in a computer-readable storage medium. On the basis of such an understanding, the technical solution of the present application in essence or that part of contribution to the prior art or a part of the technical solution may be embodied in the form of software products, which may be stored in a storage medium, comprising some instructions to cause a computer device (a personal computer, a server, a network device or the like) to execute all or a part of steps of the method as recited in the embodiments of the present application. The aforementioned storage medium comprises: a USB flash disk, a mobile hard disk, a read-only memory (ROM), a random access memory (RAM), a magnetic disk or an optical disk and other media capable of storing a program code.

The above-mentioned embodiments are merely specific embodiments of the present application, but the protection scope of the present application is not limited thereto. Any variation or substitution easily conceivable to a person of ordinary skills in the art within the technical scope disclosed in the present application shall fall into the protection scope of the present application. Therefore, the scope of protection of the present application shall be subject to the scope of protection of the claims.

What is claimed is:

1. A method for transmitting physical uplink control channel (PUCCH), comprising:
   receiving, by a terminal device, downlink control information (DCI) sent by a network device, the DCI including trigger information of aperiodic channel state information (CSI) and configuration information of a PUCCH carrying the aperiodic CSI; and
   transmitting, by the terminal device, the aperiodic CSI on the PUCCH according to the configuration information of the PUCCH when the trigger information triggers the terminal device to report the aperiodic CSI,
   wherein the configuration information of the PUCCH comprises a transmitted power control (TPC) command of the PUCCH, and the transmitting, by the terminal device, the aperiodic CSI on the PUCCH according to the configuration information of the PUCCH comprises:
      determining, by the terminal device, a sending power of the PUCCH according to the TPC command; and
      transmitting, by the terminal device, the aperiodic CSI on the PUCCH by using the sending power.

2. The method according to claim 1, wherein the configuration information of the PUCCH further comprises at least one of following information: resource configuration information of the PUCCH, reference signal resource configuration corresponding to the PUCCH, quasi-co-location (QCL) indication information of the PUCCH, and demodulation reference signal (DMRS) configuration of the PUCCH.

3. The method according to claim 1, wherein the configuration information of the PUCCH further comprises resource configuration information of the PUCCH, and the transmitting, by the terminal device, the aperiodic CSI on the PUCCH according to the configuration information of the PUCCH comprises:
   determining, by the terminal device according to the resource configuration information of the PUCCH, at least one of time-frequency resource occupied by the PUCCH and PUCCH resource occupied by the PUCCH; and
   transmitting, by the terminal device, the aperiodic CSI on the at least one of the time-frequency resource and the PUCCH resource.

4. The method according to claim 1, wherein the determining, by the terminal device, a sending power of the PUCCH according to the TPC command comprises:
   determining, by the terminal device, a closed-loop power adjustment value of the PUCCH according to the TPC command;

adjusting, by the terminal device according to the closed-loop power adjustment value, a calculated sending power; and determining, by the terminal device, a sending power after being adjusted as the sending power of the PUCCH.

5. The method according to claim 1, wherein the configuration information of the PUCCH further comprises reference signal resource configuration of the PUCCH, and the transmitting, by the terminal device, the aperiodic CSI on the PUCCH according to the configuration information of the PUCCH comprises:

determining, by the terminal device, a sending beam of the PUCCH according to the reference signal resource configuration; and transmitting, by the terminal device, the PUCCH by using the sending beam.

6. The method according to claim 5, wherein the determining, by the terminal device, a sending beam of the PUCCH according to the reference signal resource configuration comprises:

determining, by the terminal device, a sending beam or a receiving beam used for transmitting a reference signal on reference signal resource indicated by the reference signal resource configuration as the sending beam of the PUCCH.

7. The method according to claim 1, further comprising:
determining, by the terminal device, an uplink channel carrying the aperiodic CSI as the PUCCH according to indication information sent by the network device.

8. The method according to claim 7, wherein the indication information is carried in the DCI or in a CSI report configuration corresponding to the aperiodic CSI.

9. A terminal device, comprising: a processor, an input interface, configured to receive downlink control information (DCI) sent by a network device, the DCI including trigger information of aperiodic channel state information (CSI) and configuration information of a PUCCH carrying the aperiodic CSI; and an output interface, configured to transmit the aperiodic CSI on the PUCCH according to the configuration information of the PUCCH when the trigger information triggers the terminal device to report the aperiodic CSI, wherein the configuration information of the PUCCH comprises a transmitted power control (TPC) command of the PUCCH, the processor is configured to determine a sending power of the PUCCH according to the TPC command; and the output interface is configured to transmit the aperiodic CSI on the PUCCH by using the sending power.

10. The terminal device according to claim 9, wherein the configuration information of the PUCCH further comprises at least one of following information: resource configuration information of the PUCCH, reference signal resource configuration corresponding to the PUCCH, quasi-co-location (QCL) indication information of the PUCCH, and demodulation reference signal (DMRS) configuration of the PUCCH.

11. The terminal device according to claim 9, wherein the configuration information of the PUCCH further comprises resource configuration information of the PUCCH, and the processor is further configured to:

determine, according to the resource configuration information of the PUCCH, at least one of time-frequency resource occupied by the PUCCH and PUCCH resource occupied by the PUCCH; and wherein the output interface is further configured to:
transmit the aperiodic CSI on the at least one of the time-frequency resource and the PUCCH resource.

12. The terminal device according to claim 9, wherein the processor is specifically configured to:

determine a closed-loop power adjustment value of the PUCCH according to the TPC command;

adjust, according to the closed-loop power adjustment value, a calculated sending power; and determine a sending power after being adjusted as the sending power of the PUCCH.

13. The terminal device according to claim 9, wherein the configuration information of the PUCCH further comprises reference signal resource configuration of the PUCCH, and the processor is further configured to:

determine a sending beam of the PUCCH according to the reference signal resource configuration; and wherein the output interface is specifically configured to:
transmit the PUCCH by using the sending beam.

14. The terminal device according to claim 13, wherein the processor is specifically configured to:

determine a sending beam or a receiving beam used for transmitting a reference signal on reference signal resource indicated by the reference signal resource configuration as the sending beam of the PUCCH.

15. The terminal device according to claim 9, further comprising:

a processor, configured to determine an uplink channel carrying the aperiodic CSI as the PUCCH according to indication information sent by the network device.

16. The terminal device according to claim 15, wherein the indication information is carried in the DCI or carried in a CSI report configuration corresponding to the aperiodic CSI.

17. A network device, comprising:

an output interface, configured to send downlink control information (DCI) to a terminal device, the DCI including trigger information of aperiodic channel state information (CSI) and configuration information of a PUCCH carrying the aperiodic CSI, causing the terminal device to transmit the aperiodic CSI on the PUCCH according to the configuration information of the PUCCH when the trigger information triggers the terminal device to report the aperiodic CSI, wherein the configuration information of the PUCCH comprises a transmitted power control (TPC) command of the PUCCH, causing the terminal device to determine a sending power of the PUCCH according to the TPC command, and transmit the aperiodic CSI on the PUCCH by using the sending power.

18. The network device according to claim 17, wherein the configuration information of the PUCCH further comprises at least one of following information: resource configuration information of the PUCCH, reference signal resource configuration of the PUCCH, quasi-co-location (QCL) indication information of the PUCCH, and demodulation reference signal (DMRS) configuration of the PUCCH.

* * * * *